United States Patent
Tabor et al.

(10) Patent No.: US 10,414,859 B2
(45) Date of Patent: *Sep. 17, 2019

(54) HIGH RECYCLE CONTENT POLYESTER POLYOLS

(71) Applicant: Resinate Materials Group, Inc., Plymouth, MI (US)

(72) Inventors: Rick Tabor, Plymouth, MI (US); Kevin Anthony Rogers, Farmington, MI (US); Eric D Vrabel, Ferndale, MI (US); Matthew James Beatty, Ann Arbor, MI (US); Woo-Sung Bae, Midland, MI (US); Shakti L Mukerjee, Canton, MI (US)

(73) Assignee: RESINATE MATERIALS GROUP, INC., Plymouth, MI (US)

( * ) Notice: Subject to any disclaimer, the term of this patent is extended or adjusted under 35 U.S.C. 154(b) by 15 days.

This patent is subject to a terminal disclaimer.

(21) Appl. No.: 14/886,219

(22) Filed: Oct. 19, 2015

(65) Prior Publication Data

US 2016/0053050 A1 Feb. 25, 2016

Related U.S. Application Data

(63) Continuation of application No. PCT/US2015/043732, filed on Aug. 5, 2015.

(60) Provisional application No. 62/082,536, filed on Nov. 20, 2014, provisional application No. 62/059,771, filed on Oct. 3, 2014, provisional application No. 62/039,835, filed on Aug. 20, 2014.

(51) Int. Cl.
| | |
|---|---|
| *C08G 63/91* | (2006.01) |
| *C09D 175/06* | (2006.01) |
| *C08G 18/66* | (2006.01) |
| *C08G 18/72* | (2006.01) |
| *C08G 18/73* | (2006.01) |
| *C08G 18/75* | (2006.01) |
| *C08G 18/08* | (2006.01) |
| *C08G 18/22* | (2006.01) |
| *C08G 18/34* | (2006.01) |
| *C08G 18/42* | (2006.01) |

(52) U.S. Cl.
CPC ....... *C08G 63/916* (2013.01); *C08G 18/0823* (2013.01); *C08G 18/227* (2013.01); *C08G 18/348* (2013.01); *C08G 18/4225* (2013.01); *C08G 18/4288* (2013.01); *C08G 18/664* (2013.01); *C08G 18/6659* (2013.01); *C08G 18/722* (2013.01); *C08G 18/73* (2013.01); *C08G 18/755* (2013.01); *C08G 63/91* (2013.01); *C08G 63/912* (2013.01); *C08G 63/914* (2013.01); *C09D 175/06* (2013.01)

(58) Field of Classification Search
None
See application file for complete search history.

(56) References Cited

U.S. PATENT DOCUMENTS

| | | | |
|---|---|---|---|
| 4,439,550 A | 3/1984 | Brennan |
| 4,506,090 A | 3/1985 | Brennan |
| 4,546,169 A | 10/1985 | Chandler |
| 4,608,432 A | 8/1986 | Magnus |
| 5,155,163 A | 10/1992 | Abeywardena |
| 5,502,247 A | 3/1996 | Bartos |
| 5,608,000 A | 3/1997 | Duan |
| 5,763,526 A | 6/1998 | Harakawa |
| 5,922,779 A | 7/1999 | Hickey |

(Continued)

FOREIGN PATENT DOCUMENTS

| | | |
|---|---|---|
| WO | 2005085310 A2 | 9/2005 |
| WO | 2006012344 | 2/2006 |

(Continued)

OTHER PUBLICATIONS

Campestrini, Sandro et al, "Ozone Epoxidation of olefins Catalyzed by Highly Robust Manganese and Iron Porphyrin Complexes", 1991, Journal of Organic Chemistry, vol. 56 No. 11, 3725-3727.*
D. Paszun et al., Ind. Eng. Chem. Res. 36 (1997) 1373.
N. Ikladious, J. Elast. Plast. 32 (2000) 140.
K. Troev et al., J. Appl. Polym. Sci. 90 (2003) 1148.
I. Vitkauskiene, Chemija 19 (2008) 29.
D. Babb et al., Polym. Preprints 48 (2007) 855.
P. Tran et al., J. Am. Oil Chem. Soc. 82 (2005) 653.
H. Yeganeh et al., J. Appl. Polym. Sci. 99 (2006) 1222.
H. Benes et al., Polym. Degrad. Stab. 98 (2013) 2232.

(Continued)

*Primary Examiner* — Ling Siu Choi
*Assistant Examiner* — David L Miller
(74) *Attorney, Agent, or Firm* — Dilworth IP, LLC

(57) ABSTRACT

Polyester polyols made from thermoplastic polyesters are disclosed. The polyols are reaction products of a thermoplastic polyester, a glycol, and a hydrophobe selected from ricinoleic acid, ethoxylated castor oil, saturated or unsaturated $C_9$-$C_{18}$ dicarboxylic acids, tung oil, soybean oil, sunflower oil, cardanol-based products, recycled cooking oil, isostearyl alcohol, hydroxy-functional materials derived from epoxidized, ozonized, or hydroformylated fatty esters or fatty acids, and mixtures thereof. In one process, the polyols are made by reacting the thermoplastic polyester with a glycol to give a digested intermediate, which is then reacted with the hydrophobe. In another process, the thermoplastic polyester, glycol, and hydrophobe are combined and reacted in a single step. These hydrophobes facilitate the production from recycled thermoplastics of polyols that have good transparency and little or no particulate settling or phase separation. High-recycle-content polyols having desirable properties and attributes for formulating polyurethane products, including aqueous polyurethane dispersions, can be made. The polyols provide a sustainable alternative to bio- or petrochemical-based polyols.

19 Claims, No Drawings

(56) References Cited

U.S. PATENT DOCUMENTS

| | | | |
|---|---|---|---|
| 5,958,601 A | | 9/1999 | Salsman |
| 6,090,307 A | * | 7/2000 | Forster ............... C08G 18/4018 |
| | | | 252/182.24 |
| 6,133,329 A | * | 10/2000 | Shieh ................. C08G 18/4018 |
| | | | 521/131 |
| 6,229,054 B1 | | 5/2001 | Dai et al. |
| 6,339,125 B1 | | 1/2002 | Bechara |
| 6,359,022 B1 | * | 3/2002 | Hickey .............. C08G 18/4018 |
| | | | 252/182.24 |
| 6,433,121 B1 | | 8/2002 | Petrovic et al. |
| 6,465,401 B1 | | 10/2002 | Kodali et al. |
| 6,573,304 B1 | | 6/2003 | Durand |
| 6,630,601 B1 | | 10/2003 | Inada |
| 6,635,723 B1 | | 10/2003 | Maier |
| 6,642,350 B1 | | 11/2003 | Asakawa |
| 6,664,363 B1 | | 12/2003 | Faunce |
| 7,045,573 B2 | | 5/2006 | Mayer |
| 7,192,988 B2 | | 3/2007 | Smith |
| 7,342,068 B2 | | 3/2008 | Klingenberg |
| 7,560,526 B2 | | 7/2009 | Shieh |
| 7,598,336 B2 | | 10/2009 | Fukuda et al. |
| 7,858,725 B2 | | 12/2010 | Dai et al. |
| 7,902,264 B2 | | 3/2011 | Determan et al. |
| 7,994,268 B2 | | 8/2011 | Dai et al. |
| 8,263,726 B2 | | 9/2012 | Dai et al. |
| 8,299,199 B2 | | 10/2012 | Dai et al. |
| 8,410,237 B2 | | 4/2013 | Dai et al. |
| 8,598,297 B2 | | 12/2013 | Bedri et al. |
| 8,664,352 B2 | | 3/2014 | Abraham et al. |
| 2006/0205909 A1 | * | 9/2006 | O'Brien ................. C08G 18/12 |
| | | | 528/44 |
| 2007/0208096 A1 | * | 9/2007 | DeLeon ............. C08G 18/4202 |
| | | | 521/131 |
| 2007/0270518 A1 | | 11/2007 | Nutzel |
| 2008/0108760 A1 | * | 5/2008 | Mano .................... C08G 18/42 |
| | | | 525/455 |
| 2009/0131625 A1 | | 5/2009 | Kurian |
| 2009/0287007 A1 | | 11/2009 | Abraham et al. |
| 2011/0065832 A1 | | 3/2011 | Dai et al. |
| 2011/0065882 A1 | | 3/2011 | Dai et al. |
| 2011/0065883 A1 | | 3/2011 | Dai et al. |
| 2011/0065947 A1 | | 3/2011 | Dai et al. |
| 2011/0118495 A1 | | 5/2011 | Dai et al. |
| 2011/0313124 A1 | | 12/2011 | Yalamanchili et al. |
| 2012/0136169 A1 | | 5/2012 | Abraham et al. |
| 2013/0078685 A1 | | 3/2013 | Ullrich et al. |
| 2014/0031491 A1 | * | 1/2014 | Zychowski .......... C09D 167/00 |
| | | | 524/601 |
| 2014/0134534 A1 | | 5/2014 | Sacripante |

FOREIGN PATENT DOCUMENTS

| | | | |
|---|---|---|---|
| WO | 2006118995 | 11/2006 | |
| WO | 2008063613 | 5/2008 | |
| WO | 2009045926 | 4/2009 | |
| WO | WO 2009045926 A1 * | 4/2009 | ............ C08G 18/36 |
| WO | 2009058367 | 5/2009 | |
| WO | 2011057018 | 5/2011 | |
| WO | 2011146856 | 11/2011 | |
| WO | 2012083146 | 6/2012 | |
| WO | 2012083149 | 6/2012 | |
| WO | 2012135625 | 10/2012 | |
| WO | 2013154874 | 10/2013 | |

OTHER PUBLICATIONS

J. Purohit et al., Chem. Sci. J. (2012) CJS-76, 1.
M. Billiau-Loreau et al., Polymer 43 (2002) 21.
J. Vaidya et al., J. Appl. Polym. Sci. 38 (1989) 1179.
PCT International Search Report and Written Opinion dated Oct. 20, 2015 from corresponding Application No. PCT/US2015/043732, 10 pages.
R. Morrison and R. Boyd, Organic Chemistry, 3rd Ed. (1973), pp. 218-219.
M. Smith and J. Mar., Mar.'s Advanced Organic Chemistry, 5th Ed. (2001), pp. 1522-1525.
F. Carey and R. Sundberg, Advanced Organic Chemistry, Part B: Reactions and Synthesis, 3rd Ed. (1990), pp. 645-647.
R. Fumiss et al., Vogel's Textbook of Practical Organic Chemistry, 4th Ed. (1978), pp. 419-420.
R. Ackman et al., Can. J. Chem. 39 (1961) 1956.
R. Stein et al., J. Lipid Res. 3 (1962) 476.
S. Ramachandran et al., J. Lipid Res. 9 (1968) 137.

* cited by examiner

HIGH RECYCLE CONTENT POLYESTER POLYOLS

FIELD OF THE INVENTION

The invention relates to polyol compositions produced from thermoplastic polyesters, including recycled or virgin polyethylene terephthalate. The polyols, which are useful for formulating polyurethanes and other condensation polymers, incorporate particular hydrophobes.

BACKGROUND OF THE INVENTION

Aromatic polyester polyols are commonly used intermediates for the manufacture of polyurethane products, including flexible and rigid foams, polyisocyanurate foams, coatings, sealants, adhesives, and elastomers. The aromatic content of these polyols contributes to strength, stiffness, and thermal stability of the urethane product.

Commonly, the aromatic polyester polyol is made by condensing aromatic diacids, diesters, or anhydrides (e.g., terephthalic acid, dimethyl terephthalate) with glycols such as ethylene glycol, propylene glycol, diethylene glycol, or the like. These starting materials usually derive exclusively from petrochemical sources.

As companies increasingly seek to offer products with improved sustainability, the availability of intermediates produced from bio-renewable and/or recycled materials becomes more leveraging. However, there remains a need for these products to deliver equal or better performance than their traditional petroleum-based alternatives at a comparable price point.

Bio-renewable content alone can be misleading as an indicator of "green" chemistry. For example, when a food source such as corn is needed to provide the bio-renewable content, there are clear trade-offs between feeding people and providing them with performance-based chemical products. Additionally, the chemical or biochemical transformations needed to convert sugars or other bio-friendly feeds to useful chemical intermediates such as polyols can consume more natural resources and energy and can release more greenhouse gases and pollutants into the environment than their petro-based alternatives in the effort to achieve "green" status.

Waste thermoplastic polyesters, including waste polyethylene terephthalate (PET) streams (e.g., from plastic beverage containers), provide an abundant source of raw material for making new polymers. Usually, when PET is recycled, it is used to make new PET beverage bottles, PET fiber, or it is chemically transformed to produce polybutylene terephthalate (PBT). Other recycled raw materials are also available. For example, recycled propylene glycol is available from aircraft or RV deicing and other operations, and recycled ethylene glycol is available from spent vehicle coolants.

Urethane formulators demand polyols that meet required specifications for color, clarity, hydroxyl number, functionality, acid number, viscosity, and other properties. These specifications will vary and depend on the type of urethane application. For instance, rigid foams generally require polyols with higher hydroxyl numbers than the polyols used to make flexible foams.

Polyols suitable for use in making high-quality polyurethanes have proven difficult to manufacture from recycled materials, including recycled polyethylene terephthalate (rPET). Many references describe digestion of rPET with glycols (also called "glycolysis"), usually in the presence of a catalyst such as zinc or titanium. Digestion converts the polymer to a mixture of glycols and low-molecular-weight PET oligomers. Although such mixtures have desirably low viscosities, they often have high hydroxyl numbers or high levels of free glycols. Frequently, the target product is a purified bis(hydroxyalkyl) terephthalate (see, e.g., U.S. Pat. Nos. 6,630,601, 6,642,350, and 7,192,988) or terephthalic acid (see, e.g., U.S. Pat. No. 5,502,247). Some of the efforts to use glycolysis product mixtures for urethane manufacture are described in a review article by D. Paszun and T. Spychaj (*Ind. Eng. Chem. Res.* 36 (1997) 1373).

Most frequently, ethylene glycol is used as the glycol reactant for glycolysis. This is sensible because it minimizes the possible reaction products. Usually, the glycolysis is performed under conditions effective to generate bis(hydroxyethyl) terephthalate ("BHET"), although sometimes the goal is to recover pure terephthalic acid. When ethylene glycol is used as a reactant, the glycolysis product is typically a crystalline or waxy solid at room temperature. Such materials are less than ideal for use as polyol intermediates because they must be processed at elevated temperatures. Polyols are desirably free-flowing liquids at or close to room temperature.

U.S. Pat. Nos. 6,359,022 and 6,664,363 teach to use hydrophobic materials, including fatty acids, fatty acid methyl esters, and triglycerides (fats and oils) as reactive components for making aromatic polyester polyols. The hydrophobic materials provide polyols with reduced viscosity at a given hydroxyl number and improved hydrocarbon solubility compared with traditional polyester polyols. The modified aromatic polyester polyols can be used more effectively with pentane and other blowing agents used to make rigid polyurethane foams. A wide variety of hydrophobic materials are taught as suitable for use. Scrap PET is taught as a useful alternative starting material to the usual phthalic anhydride reactant, but the working examples are limited to phthalic anhydride-based polyester polyols. As noted earlier, because of the many requirements for commercially acceptable polyols, recycled PET has not been found to be a "drop-in" replacement for traditional polyester polyol starting materials.

We found, for instance, that when recycled thermoplastic polyesters such as PET are digested with a glycol and reacted with various hydrophobic materials, many of the hydrophobes give solid, thick, or opaque products, polyols that have substantial particulates, or polyols that separate into two phases.

Improved polyols are needed. In particular, the urethane industry needs sustainable polyols based in substantial part on recycled polymers such as the practically unlimited supply of recycled polyethylene terephthalate. Polyols with high recycle content that satisfy the demanding color, clarity, viscosity, functionality, and hydroxyl content requirements of polyurethane formulators would be valuable.

SUMMARY OF THE INVENTION

The invention relates to polyester polyols, processes for making them, and applications for the polyols. In one aspect, the polyol is a reaction product of a thermoplastic polyester, a glycol, and a particular hydrophobe. The hydrophobe is selected from ricinoleic acid, ethoxylated castor oils, saturated or unsaturated $C_9$-$C_{18}$ dicarboxylic acids, tung oil, soybean oil, sunflower oil, cardanol-based products, recycled cooking oil, isostearyl alcohol, hydroxy-functional materials derived from epoxidized, ozonized, or hydroformylated fatty esters or fatty acids, and mixtures thereof.

The molar ratio of glycol to thermoplastic polyester reactants is at least 2.0. The amount of hydrophobe reacted into the polyol is within the range of 3 to 70 wt. %, and the polyol has an average hydroxyl functionality within the range of 1.8 and 2.7 and a hydroxyl number within the range of 25 to 800 mg KOH/g.

In one inventive process for making polyester polyols, the thermoplastic polyester is heated with a glycol to give a digested intermediate. The intermediate is then reacted with one of the hydrophobes identifed above to give the polyol. Again, the molar ratio of glycol to thermoplastic polyester is at least 2.0, the amount of hydrophobe reacted into the polyol is within the range of 3 to 70 wt. %, and the polyol has an average hydroxyl functionality within the range of 1.8 and 2.7 and a hydroxyl number within the range of 25 to 800 mg KOH/g.

In another inventive process, no digested intermediate is prepared; the thermoplastic polyester, glycol, and hydrophobe are simply combined and reacted in a single process step.

We surprisingly found that high-recycle-content polyols having desirable hydroxyl numbers, viscosities, functionalities, appearance, and other attributes for formulating polyurethane products can be made by reacting particular hydrophobes with either a glycol and a thermoplastic polyester or a glycol-digested thermoplastic polyester intermediate. The hydrophobes facilitate production from recycled thermoplastics of polyols that have good transparency and little or no particulate settling or phase separation. The polyols, which are valuable for formulating a variety of polyurethanes and related products—including polyurethane dispersions, flexible and rigid foams, coatings, adhesives, sealants, and elastomers—provide a sustainable alternative to bio- or petrochemical-based polyols.

DETAILED DESCRIPTION OF THE INVENTION

In one aspect, the polyol is a reaction product of a thermoplastic polyester, a glycol, and a particular hydrophobe.

Thermoplastic polyesters suitable for use are well known in the art. They are condensation polymers produced from the reaction of glycols and aromatic dicarboxylic acids or acid derivatives. Examples include polyethylene terephthalate (PET); polybutylene terephthalate (PBT); polytrimethylene terephthalate (PTT); glycol-modified polyethylene terephthalate (PETG); copolymers of terephthalic acid and 1,4-cyclohexanedimethanol (PCT); PCTA (an isophthalic acid-modified PCT); polyhydroxy alkanoates, e.g., polyhydroxybutyrate; copolymers of diols with 2,5-furandicarboxylic acid or dialkyl 2,5-furandicarboxylates, e.g., polyethylene furanoate; copolymers of 2,2,4,4-tetramethyl-1,3-cyclobutanediol with isophthalic acid, terephthalic acid or orthophthalic derivatives; dihydroferulic acid polymers; and the like, and mixtures thereof. Further examples of polyester thermoplastics are described in *Modern Polyesters: Chemistry and Technology of Polyesters and Copolyesters*, J. Scheirs and T. Long, eds., Wiley Series in Polymer Science, 2003, John Wiley & Sons, Ltd. Hoboken, N.J. Other examples of thermoplastic polyesters may be found in Chapters 18-20 of *Handbook of Thermoplastics, O. Olabisi, ed.,* 1997, Marcel Dekker, Inc. New York. Suitable thermoplastic polyesters include virgin polyesters, recycled polyesters, or mixtures thereof. Polyethylene terephthalate is particularly preferred, especially recycled polyethylene terephthalate (rPET), virgin PET, and mixtures thereof. For more examples of suitable thermoplastic polyesters, see U.S. Pat. Appl. Publ. No. 2009/0131625, the teachings of which are incorporated herein by reference.

Recycled polyethylene terephthalate suitable for use in making the inventive polyester polyols can come from a variety of sources. The most common source is the post-consumer waste stream of PET from plastic bottles or other containers. The rPET can be colorless or contain dyes (e.g., green, blue, or other colors) or be mixtures of these. A minor proportion of organic or inorganic foreign matter (e.g., paper, other plastics, glass, metal, etc.) can be present. A desirable source of rPET is "flake" rPET, from which many of the common impurities present in scrap PET bottles have been removed in advance. Another desirable source of rPET is pelletized rPET, which is made by melting and extruding rPET through metal filtration mesh to further remove particulate impurities. Because PET plastic bottles are currently manufactured in much greater quantity than any recycling efforts can match, scrap PET will continue to be available in abundance.

Glycols suitable for use are well known. By "glycol," we mean a linear or branched, aliphatic or cycloaliphatic compound or mixture of compounds having two or more hydroxyl groups. Other functionalities, particularly ether or ester groups, may be present in the glycol. In preferred glycols, two of the hydroxyl groups are separated by from 2 to 10 carbons, preferably 2 to 5 carbons. Suitable glycols include, for example, ethylene glycol, propylene glycol, 1,3-propanediol, 1,2-butylene glycol, 1,3-butylene glycol, 1,4-butanediol, 2-methyl-1,3-propanediol, pentaerythritol, sorbitol, neopentyl glycol, glycerol, trimethylolpropane, 3-methyl-1,5-pentanediol, 1,4-cyclohexane-dimethanol, 1,3-cyclohexanedimethanol, diethylene glycol, dipropylene glycol, triethylene glycol, 1,6-hexanediol, tripropylene glycol, tetraethylene glycol, polyethylene glycols having a number average molecular weight up to about 400 g/mol, block or random copolymers of ethylene oxide and propylene oxide, and the like, and mixtures thereof. Preferably, the glycol is selected from propylene glycol, 2-methyl-1,3-propanediol, 3-methyl-1,5-pentanediol, neopentyl glycol, diethylene glycol, polyethylene glycol having a number average molecular weight of about 200, and mixtures thereof. Propylene glycol is particularly preferred. In a preferred aspect, the glycol is a recycled glycol, especially recycled propylene glycol. Propylene glycol recovered from used deicing fluids is one example.

Suitable hydrophobes are selected from ricinoleic acid, ethoxylated castor oils, saturated or unsaturated $C_9$-$C_{18}$ dicarboxylic acids, tung oil, soybean oil, sunflower oil, cardanol-based products, recycled cooking oil, isostearyl alcohol, hydroxy-functional materials derived from epoxidized, ozonized, or hydroformylated fatty esters or fatty acids, and mixtures thereof. We found that these hydrophobes are well-suited to be reacted with glycols and thermoplastic polyesters, especially recycled PET, or with digested intermediates made from the glycols and thermoplastic polyesters. The resulting products are non-viscous, pourable liquids that usually have good transparency, low particulates, and little or no tendency to phase separate.

Ricinoleic acid can be used as the hydrophobe. With recycled PET, we found that ricinoleic acid gives transparent, low-viscosity polyester polyols with no evidence of settling upon storage. Castor oil contains 90% or more of ricinoleic acid residues, and is a convenient and primary source of the acid. Also known as 12-hydroxy-9-cis-octadecenoic acid, ricinoleic acid has acid, olefin, and hydroxy functional groups. Examples 1-7 (Table 1) illustrate the use of ricinoleic acid alone as the hydrophobe. In another aspect, we found that ricinoleic acid can be combined with a wide variety of dicarboxylic acids, particularly $C_6$-$C_{18}$ dicarboxylic acids, to give low-viscosity polyols that are free of settling issues and are frequently transparent. In contrast, many dicarboxylic acids, for example adipic acid, give opaque or thick polyols when used alone as the hydrophobe. Examples 49-67 (Table 3) illustrate that ricinoleic acid can be combined with dicarboxylic acids to provide useful polyester polyols.

Ethoxylated castor oils are also suitable for use as the hydrophobe. Castor oils ethoxylated with various proportions of ethylene oxide, for instance 5 to 100 moles of EO per mole of castor oil, are commercially available. Ethoxylated castor oils have ester (glyceride), olefin, and primary hydroxyl functionalities. Examples include Toximul® 8241, Toximul® 8242, and Toximul® 8244, products of Stepan Company, and the Etocas™ series of ethoxylated castor oils from Croda. Ethoxylated castor oils can also be synthesized using well-known processes by reacting the oil with ethylene oxide in the presence of an alkoxide, Lewis acid, double metal cyanide complex, or other suitable ethoxylation catalyst. Examples 19 and 20 (Table 1) illustrate the use of ethoxylated castor oils as the hydrophobe.

Dicarboxylic acids suitable for use as the hydrophobe are saturated or unsaturated $C_9$ to $C_{18}$ dicarboxylic acids. Examples include azelaic acid, nonenedioic acid, sebacic acid, decenedioic acid, dodecanedioic acid, dodecenedioic acid, tetradecanedioic acid, tetradecenedioic acid, hexadecanedioic acid, hexadecenedioic acid, octadecanedioic acid, octadecenedioic acid, and the like, and mixtures thereof. Dicarboxylic acids are generally widely available from commercial sources. Examples 14-18 (Table 1) illustrate the use of dicarboxylic acids used alone as the hydrophobe, while Examples 49-67 (Table 3) show that they can be used in combination with ricinoleic acid, as discussed above.

Tung oil, also called "China wood oil," is also suitable for use as the hydrophobe. Tung oil is a triglyceride. The principal fatty acid residues (about 82%) are from alpha-eleostearic acid, a $C_{18}$ fatty acid with 9-cis, 11-trans, 13-trans unsaturation. The other fatty acid residues are from linoleic acid (8.5%), palmitic acid (5.5%), and oleic acid (4%). Consequently, tung oil has ester (glyceride) and olefin functionalities, and compared with other oils, it is highly unsaturated. Examples 8-13 (Table 1) illustrate the use of tung oil as the hydrophobe for making modified PET polyester polyols.

Soybean oil can be used as the hydrophobe when the proportion of glycol to thermoplastic polyester used is sufficiently high. We found, for instance, that too little glycol results in products that are opaque, have settling issues, or both when soybean oil is the hydrophobe (Table 2, Comparative Examples 43 and 44). However, as shown in Example 22, when enough glycol is used (here, 3.0 moles of glycol per mole of PET), transparent products with no settling can be made. Preferably, when soybean oil is used as the hydrophobe, the thermoplastic polyester is PET, a catalyst comprising titanium is used, propylene glycol is the glycol, and a propylene glycol to PET molar ratio within the range of 2.5 to 4.5 is used.

Sunflower oil, which is rich in polyunsaturated fatty acid residues, is also a suitable hydrophobe. Suitable sunflower oil is readily available commercially from many suppliers. We found that sunflower oil, particularly when used with propylene glycol and PET, provides low-color, low-viscosity polyols that are transparent and free of settling problems. Example 23 (Table 1) is illustrative.

Cardanol-based products can also be used as the hydrophobe. Cardanol, the main constituent of cashew nutshell oil, is an alkylated phenol having a linear $C_{15}$ unsaturated alkyl chain. By "cardanol-based products," we mean to include cardanol and products derived from cardanol. Such products may include alkoxylated cardanols, including the hydroxyalkylated compositions described in U.S. Pat. No. 6,229,054, the teachings of which are incorporated herein by reference. Also suitable are "cardanol dimers," which can be made by joining two cardanol groups using a siloxane linker. In some aspects, Mannich chemistry is used to introduce amine functionality as an attachment to the phenolic rings of the cardanol dimers. Other functionalities, such as epoxy groups, can be introduced if desired. Suitable cardanol-based products, including cardanol dimers, are disclosed in U.S. Pat. Nos. 7,858,725; 7,994,268; 8,263,726; U.S. Pat. Appl. Publ. Nos. 2011/0118495; 2011/0065947; 2011/0065883; 2011/0065882; and 2011/0065832, the teachings of which are incorporated herein by reference. We found, for instance, that a reaction product of Cardolite® LITE 2020 resin modifier (a hydroxyethylated cardanol) and an acid-functional anhydride (e.g., trimellitic anhydride) provides a suitable hydrophobe for making an inventive polyester polyol (see Table 1, Example 27).

Recycled cooking oils are also suitable hydrophobes. The cooking oils, which contain vegetable oil mixtures, are collected from restaurants or commercial food preparation facilities. We surprisingly found that such cooking oils can be used successfully as the hydrophobe component for making polyester polyols having acceptable properties and very high recycle contents. Example 28 illustrates the use of recycled cooking oil as a raw material for making an inventive polyester polyol. The product may be dark, even after carbon treatment, but its properties are generally consistent with requirements for acceptable polyols.

Isostearyl alcohol, a commonly used fatty alcohol available as an article of commerce, is also suitable for use as a hydrophobe (see Table 1, Example 21). When isostearyl alcohol is used as the hydrophobe, it is preferred to use a polyol having a hydroxyl functionality greater than 2, e.g., glycerin, to boost the overall average hydroxyl functionality to be within the range of 1.8 to 2.7.

Hydroxy-functional materials derived from epoxidized, ozonized, or hydroformylated fatty esters or fatty acids, also commonly known as "bio-polyols" or "natural oil polyols" are another category of suitable hydrophobes. These products can be made from fatty esters (including natural oils) or fatty acids in several steps. Some products include a step to epoxidize carbon-carbon double bonds in the fatty ester or fatty acid, followed by a ring-opening step. In other products, unsaturation in the fatty ester or fatty acid is hydroformylated and then hydrogenated to introduce the hydroxyl functionality (see, e.g., D. Babb et al., *Polym. Preprints* 48 (2007) 855, PCT Internat. Appl. WO 2006/012344, and U.S. Pat. No. 8,598,297, the teachings of which are incorporated herein by reference). Polyols made by hydrolysis or alcoholysis of epoxidized soybean oil are among the suitable bio-polyols. BiOH® polyols supplied by Cargill (e.g., BiOH® X-0002) and Agrol® polyols from BioBased Technologies are also suitable. The bio-polyol can also be generated "in situ" from a reaction between the glycol and an epoxidized fatty ester or an epoxidized fatty acid (such as epoxidized soybean oil, epoxidized methyl oleate, epoxidized oleic acid, or epoxidized methyl soyate). Suitable bio-polyols include polyols derived from ozonized fatty esters or ozonized fatty acids, such as mixtures obtained by ozonolysis of a natural oil in the presence of a glycol, as is described by P. Tran et al., *J. Am. Oil Chem. Soc.* 82 (2005) 653. Examples 24-26 (Table 1) illustrate the use of certain bio-polyols as the hydrophobe. For more examples of suitable bio-polyols, see U.S. Pat. Nos. 6,433,121; 8,664,352, U.S. Publ. Nos. 2012/0136169, 2011/0313124, and 2009/0287007, and PCT Appl. No. WO2009/058367, the teachings of which are incorporated herein by reference.

In some aspects, the thermoplastic polyester and glycol are first heated, optionally in the presence of a catalyst, to give a digested intermediate. The digested intermediate will commonly be a mixture of glycol reactant, glycol(s) generated from the thermoplastic polyester, terephthalate oligomers, and other glycolysis products. For example, when PET or rPET is the thermoplastic polyester, the digested intermediate will include a mixture of glycol reactant, ethylene glycol (generated from the PET or rPET), bis(2-hydroxyalkyl) terephthalate ("BHAT"), higher PET oligomers, and other glycolysis products. Similar digested mixtures in various forms have been made and characterized previously (see, e.g., D. Paszun et al., *Ind. Eng. Chem. Res.* 36 (1997) 1373 and N. Ikladious, *J. Elast. Plast.* 32 (2000) 140). Heating is advantageously performed at temperatures within the range of 80° C. to 260° C., preferably 100° C. to 250° C., more preferably 130° C. to 240° C., and most preferably 160° C. to 230° C.

In one aspect, when the thermoplastic polyester is polyethylene terephthalate, the digested intermediate comprises glycols and a terephthalate component. The terephthalate component preferably comprises, by gel permeation chromatography using ultraviolet detection, 45 to 70 wt. % of bis(hydroxyalkyl)terephthalates. In a preferred aspect, the terephthalate component further comprises 20 to 40 wt. % of terephthalate dimers. In another preferred aspect, the terephthalate component of the digested intermediate comprises 45 to 65 wt. % of bis(hydroxyalkyl)terephthalates, 20 to 35 wt. % of terephthalate dimers, and 5 to 15 wt. % of terephthalate trimers. In another preferred aspect, the terephthalate component comprises 50 to 60 wt. % of bis(hydroxyalkyl)terephthalates, 25 to 30 wt. % of terephthalate dimers, and 8 to 12 wt. % of terephthalate trimers.

Catalysts suitable for making the digested intermediate are well known (see, e.g., K. Troev et al., *J. Appl. Polym. Sci.* 90 (2003) 1148). In particular, suitable catalysts comprise titanium, zinc, antimony, germanium, zirconium, manganese, or other metals. Specific examples include titanium alkoxides (e.g., tetrabutyl titanate or tetraisopropyl titanate), titanium(IV) phosphate, zirconium alkoxides, zinc acetate, lead acetate, cobalt acetate, manganese(II) acetate, antimony trioxide, germanium oxide, or the like, and mixtures thereof. Catalysts that do not significantly promote isocyanate reaction chemistries are preferred. As is discussed in more detail below, catalysts comprising titanium, particularly titanium alkoxides, are especially preferred. The amount of catalyst used is typically in the range of 0.005 to 5 wt. %, preferably 0.01 to 1 wt. %, more preferably 0.02 to 0.7 wt. %, based on the total amount of polyol being prepared.

Usually, the digestion reaction is performed by heating the thermoplastic polyester, glycol(s), and any catalyst at least until the mixture liquefies and particles of the thermoplastic polyester are no longer apparent. Reaction times range from about 30 minutes to about 16 hours, more typically 1 to 10 hours, even more typically 3 to 8 hours, and will depend on the reaction temperature, source of the thermoplastic polyester, the particular glycol reactant used, mixing rate, desired degree of depolymerization, and other factors that are within the skilled person's discretion.

The molar ratio of glycol to thermoplastic polyester is at least 2.0, preferably 2.0 to 6.0, more preferably 2.5 to 4.5. When the glycol/thermoplastic polyester molar ratio is below 2.0, the hydrophobe-modified polyester products are often solids or too viscous to be practical for use as polyols. On the other hand, when the glycol/thermoplastic polyester molar ratio is greater than about 6, the hydroxyl numbers tend to exceed the practical upper limit of about 800 mg KOH/g.

When a digested intermediate is prepared, it is reacted in a second step with one of the particular hydrophobes described above to give an inventive polyester polyol. The reaction between the digested intermediate and the hydrophobe is performed under conditions effective to promote one or more of several different possible reactions between the digested intermediate and the hydrophobe, principally condensation reactions. For instance, hydroxyl groups in the digested intermediate can react with acid or ester groups in the hydrophobe to generate esters from the acids or new esters from the original ones. Because the hydrophobes often have hydroxyl functionality as well, new esters can be formed that utilize that hydroxyl functionality. Other kinds of reactions may occur, including crosslinking or cycloaddition reactions involving carbon-carbon double bonds and/or allylic hydrogens that were originally present in the hydrophobe.

Reactions between the digested intermediate and hydrophobe are preferably performed by heating at temperatures within the range of 80° C. to 260° C., preferably 90° C. to 230° C., more preferably 100° C. to 220° C., and most preferably 110° C. to 210° C. Water generated in this reaction is advantageously removed from the reaction mixture as it forms. On a lab scale, it is convenient to use a Dean-Stark trap or similar apparatus to remove the water of reaction, but other means will be more practical on a larger scale. Continuous processes for water removal, such as vacuum stripping, wiped-film evaporation, sparging with dry air or nitrogen, and the like, may be desirable. The reaction is normally continued until a pre-determined amount of water has been collected or a target acid number and/or hydroxyl number is reached for the product.

The amount of hydrophobe incorporated into the polyol is within the range of 3 to 70 wt. %, preferably 4 to 60 wt. %, and most preferably 5 to 55 wt. %. When less than 3 wt. % of hydrophobe is used, there is too little benefit from including it in terms of generating useful polyols (for instance, the hydroxyl numbers may reach or exceed their useful upper limit). When more than 70 wt. % of the hydrophobe is used, formulation cost may be higher than desirable, and there is usually little or no additional performance benefit.

As long as the polyol incorporates one the above-mentioned hydrophobes, one or more anhydrides, diesters, or dicarboxylic acids outside the $C_9$-$C_{18}$ range can also be included. Suitable dicarboxylic acids include, for example, glutaric acid, adipic acid, succinic acid, cyclohexane dicarboxylic acids, maleic acid, fumaric acid, itaconic acid, phthalic acid, 1,5-furandicarboxylic acid, dimer or trimer fatty acids, isophthalic acid, and anhydrides thereof (e.g., maleic anhydride, phthalic anhydride, itaconic anhydride, and the like). Mixtures of dicarboxylic acids can be used, including, e.g., the commercially available mixture of dibasic acids known as "DBA." A typical DBA composition might contain 51-61 wt. % glutaric acid, 18-28 wt. % succinic acid, and 15-25 wt. % adipic acid.

In another aspect, the polyester polyol is made in a single step by reacting the thermoplastic polyester, glycol, and hydrophobe under conditions effective to produce the polyol. As with polyols made using the two-step process, the molar ratio of glycol to thermoplastic polyester is at least 2.0, the amount of hydrophobe reacted into the polyol is within the range of 3 to 70 wt. %, and the resulting polyol has an average hydroxyl functionality within the range of 1.8 to 2.7 and a hydroxyl number within the range of 25 to 800 mg KOH/g. When the single-step process is used, it is preferred to utilize a condensation system that returns glycols to the reaction vessel while allowing removal of water, as removal of too much glycol can result in cloudy or opaque polyols. Examples 11 and 20 below illustrate the single-step process for making the polyester polyols.

The inventive polyester polyols have hydroxyl numbers within the range of 25 to 800 mg KOH/g, preferably 35 to 500 mg KOH/g, more preferably 40 to 400 mg KOH/g. Hydroxyl number can be measured by any accepted method for such a determination, including, e.g., ASTM E-222 ("Standard Test Methods for Hydroxyl Groups Using Acetic Anhydride Acetylation").

The inventive polyols have average hydroxyl functionalities (i.e., the average number of —OH groups per molecule) within the range of 1.8 to 2.7, preferably 2.0 to 2.5.

The inventive polyols are flowable liquids under ambient conditions. Preferably, the polyols have viscosities measured at 25° C. less than 30,000 cP, more preferably less than 20,000 cP, most preferably less than 10,000 cP. A preferred range for the polyol viscosity is 300 to 5,000 cP, more preferably 500 to 3,000 cP. Viscosity can be determined by any industry-accepted method. It is convenient to use, for instance, a Brookfield viscometer (such as a Brookfield DV-III Ultra rheometer) fitted with an appropriate spindle, and to measure a sample at several different torque settings to ensure an adequate confidence level in the measurements.

The polyols preferably have low acid numbers. Urethane manufacturers will often require that a polyol have an acid number below a particular specification. Low acid numbers can be ensured by driving reactions by removal of water from the reaction mixture to the desired level of completion. Preferably, the polyols have an acid number less than 30 mg KOH/g, more preferably less than 10 mg KOH/g, and most preferably less than 5 mg KOH/g. Acid numbers can be adjusted if necessary for a particular application with an acid scavenger such as, for example, an epoxide derivative, and this treatment can be performed by the manufacturer, distributor, or end user.

An advantage of the polyester polyols is their reduced reliance on bio- or petrochemical sources for raw material. Preferably, the polyols include greater than 10 wt. %, more preferably greater than 25 wt. %, most preferably greater than 40 wt. % of recycle content. A preferred range for the recycle content is 25 to 100 wt. %. By "recycle content," we mean the combined amounts of thermoplastic polyester and any recycled glycol or dicarboxylic acid. Some glycols, such as propylene glycol or ethylene glycol, are available as recovered or recycled materials. For instance, propylene glycol is used in deicing fluids, and after use, it can be recovered, purified, and reused. Often, the hydrophobe is prepared from renewable resources. Certain hydrophobes, such as recycled cooking oil, may also be a source of the recycle content. Recycle content can be calculated, for instance, by combining the masses of thermoplastic polyester and any recycled PG, recycled dicarboxylic acids, or recycled hydrophobe, dividing this sum by the total mass of reactants (glycols, thermoplastic polyester, hydrophobe, and any dicarboxylic acids), and then multiplying the result by 100.

Although performance in the ultimate end use is paramount, urethane manufacturers like to purchase polyols that have an appearance of quality. When other considerations are equal, a transparent (or nearly transparent) polyol may appear to be of higher quality and easier to process than an opaque one. ("Dispersion polyols" or "polymer polyols," which are common components of the load-bearing, high-resiliency urethane foams used in automotive seating or furniture applications, are a notable exception; they are supposed to appear opaque.) Unlike known polyols that are made by reacting thermoplastic polyester digestion products with dicarboxylic acids such as succinic acid or phthalic anhydride, which are often opaque, the inventive polyols are frequently transparent or nearly so.

Yet another desirable polyol attribute is the absence of settling, particularly upon prolonged storage. When settling is substantial, the polyol might have to be filtered or otherwise treated to remove the solids content; this is preferably avoided. Preferred inventive polyols exhibit no settling or only a slight degree of settling, and more preferred polyols exhibit no evidence of settling.

In a particular aspect, virgin PET, recycled PET, or a mixture thereof is heated with propylene glycol in the presence of a titanium catalyst to give a digested intermediate. The intermediate is then reacted with a hydrophobe selected from ricinoleic acid and mixtures thereof with a saturated or unsaturated $C_9$-$C_{18}$ dicarboxylic acid to give the polyester polyol. The molar ratio of glycol to PET is within the range of 2.5 to 4.5, the amount of hydrophobe present in the polyol is within the range of 4 to 60 wt. %, and the polyol has an average hydroxyl functionality within the range of 1.8 to 2.7, a hydroxyl number within the range of 35 to 500 mg KOH/g, a viscosity at 25° C. less than 10,000 cP, and a recycle content as defined herein greater than 25 wt. %.

In another particular aspect, a polyester polyol is made by a process which comprises first heating virgin PET, recycled PET, or a mixture thereof with propylene glycol in the presence of a titanium catalyst to give a digested intermediate. The intermediate is then reacted with a hydrophobe selected from the group consisting of ricinoleic acid, ethoxylated castor oils, saturated or unsaturated $C_9$-$C_{18}$ dicarboxylic acids, tung oil, soybean oil, sunflower oil, isostearyl alcohol, hydroxy-functional materials derived from epoxidized or hydroformylated fatty esters or fatty acids, and mixtures thereof to give the polyol. The molar ratio of glycol to PET is within the range of 2.5 to 4.5, the amount of hydrophobe reacted into the polyol is within the range of 4 to 60 wt. %, and the polyol has an average hydroxyl functionality within the range of 1.8 to 2.7, a hydroxyl number within the range of 35 to 500 mg KOH/g, a viscosity at 25° C. less than 10,000 cP, and a recycle content as defined herein greater than 25 wt. %.

The inventive polyester polyols can be used to formulate a wide variety of polyurethane products. By adjusting the proportion of hydrophobe used, a desired degree of polyol hydrophobicity can be "dialed in." The ability to control hydrophobicity is particularly valuable in the coatings industry. The polyols can be used for cellular, microcellular, and non-cellular applications including flexible foams, rigid foams (including polyisocyanurate foams), urethane dispersions, coatings, adhesives, sealants, and elastomers. The resulting polyurethanes are potentially useful for automotive and transportation applications, building and construction products, marine products, packaging foam, flexible slabstock foam, carpet backing, appliance insulation, cast elastomers and moldings, footwear, biomedical devices, and other applications.

Further, the inventive polyester polyols may be derivatized to form mono-, di- and polyacrylates via esterification or transesterification with acrylic acid or methacrylic acid-derived raw materials. Thus, in one aspect, the invention relates to a curable resin comprising a reaction product of an acrylate or methacrylate source and an inventive polyol. Examples of (meth)acrylation raw materials suitable for forming (meth)acrylate derivatives of the inventive polyester polyols include acryloyl chloride, methacryloyl chloride, methacrylic acid, acrylic acid, methyl acrylate, methyl methacrylate, and the like, or mixtures thereof. Such (meth)acrylate-derivatized inventive polyester polyols are useful for radiation or UV-cure coating formulations or applications. Prepolymers of the inventive polyester polyols may be derivatized to form urethane (meth)acrylates via reaction with hydroxyethyl (meth)acrylate. The resulting urethane acrylates may also be used in radiation or UV-cure coating formulations or applications.

In a particular aspect, the invention relates to aqueous polyurethane dispersions made from the inventive polyester polyols. The hydrophobe-modified polyols are readily formulated into aqueous polyurethane dispersions having a desirable balance of properties, including high solids, low viscosities, and a low tendency to settle. Numerous ways to formulate aqueous polyurethane dispersions are known and suitable for use. Preferably, the polyurethane dispersion is made by emulsifying an isocyanate-terminated prepolymer in water with the aid of an emulsifying agent. Water, a water-soluble polyamine chain extender, or a combination thereof may be used to react with the emulsified prepolymer. The prepolymer is preferably made by reacting an inventive polyester polyol, a hydroxy-functional emulsifier, one or more auxiliary polyols, and one or more polyisocyanates. The aqueous polyurethane dispersions are preferably used to formulate water-borne coatings, adhesives, sealants, elastomers, and similar urethane products, and they are particularly valuable for reducing reliance on solvents. For instance, the dispersions can be used to formulate low- or zero-VOC compositions.

Polyisocyanates suitable for use in making the prepolymers are well known; they include aromatic, aliphatic, and cycloaliphatic polyisocyanates. Examples include toluene diisocyanates (TDIs), MDIs, polymeric MDIs, naphthalene diisocyanates (NDIs), hydrogenated MDIs, trimethyl- or tetramethylhexamethylene diisocyanates (TMDIs), hexamethylene diisocyanate (HDI), isophorone diisocyanates (IPDIs), cyclohexane diisocyanates (CHDIs), xylylene diisocyanates (XDI), hydrogenated XDIs, and the like. Aliphatic diisocyanates, such as hexamethylene diisocyanate and isophorone diisocyanates are particularly preferred.

Auxiliary polyols suitable for use are also well known. They include polyether polyols, aliphatic polyester polyols, aromatic polyester polyols, polycarbonate polyols, glycols, and the like. Preferred auxiliary polyols have average hydroxyl functionalities within the range of 2 to 6, preferably 2 to 3, and number average molecular weights within the range of 500 to 10,000, preferably 1,000 to 8,000. Preferred polyester polyols are condensation products of dicarboxylic acids and diols or triols (e.g., ethylene glycol, propylene glycol, 2-methyl-1,3-propanediol, 3-methyl-1,5-pentanediol, 1,4-butanediol, neopentyl glycol, glycerin, trimethylolpropane, 1,4-cyclohexanedimethanol, bisphenol A ethoxylates), especially diols. The dicarboxylic acids can be aliphatic (e.g., glutaric, adipic, succinic) or aromatic (e.g., phthalic), preferably aliphatic.

A hydroxy-functional emulsifier is also used to make the polyurethane dispersions. The role of this component is to impart water-dispersibility to the prepolymer, usually upon its combination with water and a neutralizing agent, such as an acid or base reactant. Thus, in one aspect, the hydroxy-functional emulsifier is an acid-functional diol such as dimethylolpropionic acid (DMPA) or dimethylolbutanoic acid (DMBA). The acid functionality in the resulting prepolymer allows for neutralization with an amine or other basic reactant to generate a water-dispersible urethane. The hydroxy-functional emulsifier can also be an amine, such as N-methyldiethanolamine. Neutralization of the resulting prepolymer with an acidic reagent renders it water dispersible. In other aspects, the hydroxy-functional emulsifier is nonionic, e.g., a polyethylene glycol monomethyl ether. In another aspect, the hydroxy-functional emulsifier may be a monol- or diol-functionalized poly(ethylene oxide), such as for example Ymer™ N120 dispersing monomer (product of Perstorp). Additionally, non-reactive, so-called "external emulsifiers," such as the triethanolamine salt of dodecylbenzene sulfonic acid, may be included in the aqueous phase to assist in the emulsification and stabilization of the prepolymer and resulting polyurethane dispersion.

In certain aspects, a chain terminator may be used to control the molecular weight of polyurethane polymer contained within the aqueous polyurethane dispersion. Monofunctional compounds, such as those containing hydroxyl, amino, and thio groups that have a single active hydrogen-containing group, are suitable chain terminators. Examples include alcohols, amines, thiols, and the like, especially primary and secondary aliphatic amines.

Chain extenders can also be included in making the polyurethane dispersion. In some aspects, the chain extender is added in an amount sufficient to react 5 to 105 mole % of free NCO groups present. Suitable chain extenders contain at least two functional groups that are capable of reacting with isocyanates, e.g., hydroxyl, thio, or amino groups in any combination. Suitable chain extenders include, for example, diols (ethylene glycol, propylene glycol, diethylene glycol, neopentyl glycol, 1,4-butanediol, 2-methyl-1,3-propanediol, 3-methyl-1,5-pentanediol, 1,4-cyclohexanedimethanol, and the like), di- and polyamines (ethylenediamine, diethylenetriamine, Jeffamine® T-403, Jeffamine® D-230, Jeffamine® ED-2001, Jeffamine® ED-600, Jeffamine® ED-900,1,6-hexamethylenediamine, butylenediamine, hydrazine, piperazine, N-hydroxyethyl ethylenediamine) alkanolamines (ethanolamine, diethanolamine, N-methyl diethanolamine, and the like), dithiols, and the like. Diol chain extenders are preferably added during the preparation of the prepolymer, and prior to emulsification in water, while amine chain extenders are preferably added after emulsification in water.

In a typical example, the hydrophobe-modified polyester polyol, an acid-functional diol (DMPA), and auxiliary polyols (polyethylene glycol 200 and a polyester polyol made from 3-methyl-1,5-pentanediol and adipic acid) are combined and reacted with a mixture of aliphatic diisocyanates (hexamethylene diisocyanate and isophorone diisocyanate) in the presence of a tin catalyst (dibutyltin dilaurate) or a bismuth catalyst (such as bismuth dioctanoate) and a solvent (acetone). The resulting prepolymer is then dispersed in a mixture of water, triethanolamine (neutralizing agent), and a silicone defoamer. The expected product is an aqueous polyurethane dispersion having high solids content, low viscosity, and desirable settling properties.

For more examples of suitable approaches for preparing aqueous polyurethane dispersions, see U.S. Pat. Nos. 5,155, 163; 5,608,000; 5,763,526; 6,339,125; 6,635,723; 7,045,573; and 7,342,068, the teachings of which are incorporated herein by reference.

The following examples merely illustrate the invention; the skilled person will recognize many variations that are within the spirit of the invention and scope of the claims.

Preparation of Hydrophobe-Modified Polyols: General Procedure

A reactor equipped with an overhead mixer, condenser, heating mantle, thermocouple, and nitrogen inlet is charged with zinc acetate dihydrate (0.55 wt. %), or titanium(IV) butoxide (500-1000 ppm); recycled polyethylene terephthalate pellets; and propylene glycol in the proportions shown in Table 1. In some examples, glycerin or polyethylene glycol 200 is used instead of propylene glycol (see tables). The mixture is heated and stirred until the reactor contents reach 180° C. The mixture is heated until no particles of recycled PET remain (about 4 h). When the digestion reaction is considered complete, the mixture is cooled to about 100° C. The hydrophobe or hydrophobe blend is added (see Tables 1-3 for amounts), and the mixing rate is increased (200 rpm). The hydrophobes used for the inventive examples (Table 1) are ricinoleic acid, tung oil, azelaic acid, dodecanedioic acid, Toximul® 8244 (ethoxylated castor oil), isostearyl alcohol, soybean oil, sunflower oil, Cardolite® LITE 2020 epoxy curing agent, recycled cooking oil, and three bio-polyols (Cargill's BiOH® polyol, epoxidized soybean oil, and a polyol made by ring opening of epoxidized soybean oil with propionic acid). When the addition is complete, a Dean-Stark trap is introduced between the reactor and condenser, and heating to 200° C. is resumed. Water generated in the condensation reaction is removed until roughly the theoretical amount is removed. When the reaction is complete, the polyol product is allowed to cool to 100° C. and is then decanted from the reactor and filtered through cheesecloth.

In most examples, the hydrophobe (or its mixture with a dicarboxylic acid, as in Table 3) is added following digestion of the recycled PET with the propylene glycol, as described above. In Examples 11 and 20, however, the hydrophobe is added at the outset, i.e., before digestion.

"Recycle content" as used herein (wt. %) is determined by combining the masses of recycled glycol, recycled thermoplastic polyester, and recycled hydrophobe and dividing this sum by the total mass of reactants (e.g., glycols, rPET, hydrophobe, and any dicarboxylic acids), and then multiplying the result by 100.

Hydroxyl numbers and acid numbers are determined by standard methods (ASTM E-222 and ASTM D3339, respectively).

Viscosities are measured at 25° C. using a Brookfield DV-III Ultra rheometer with spindle #31 at 25%, 50%, and 75% torque.

Color, clarity, and degree of settling are evaluated visually.

Results:

As shown in Table 1, polyols having hydroxyl numbers below 800 mg KOH/g (especially below 600 mg KOH/g), favorable viscosities (especially below 1500 cP), and recycle contents greater than 10 wt. % (especially greater than 30%) can be made by reacting glycol-digested recycled PET with particular hydrophobes, where the molar ratio of glycol to rPET is at least 2.0 and the amount of hydrophobe reacted into the polyester polyol is within the range of 3 to 70 wt. %. Reacting the glycol-digested rPET with these hydrophobes also makes it possible to generate polyols that are usually transparent and free of settling or phase separation problems. A single-step process in which the PET, glycol, and hydrophobe are reacted together (without a digested intermediate) can also be used (see Examples 11 and 20).

Runs with comparative hydrophobes (see Table 2) are included to show that not all conditions and not all hydrophobes are suitable for use in making polyols having the desired balance of low viscosity, good transparency, low particulate content, and lack of phase separation issues. The comparative hydrophobes include a dicyclopentadiene-linseed oil metathesis product, Isocarb® 24 (a primary, saturated fatty acid having defined branching and derived from oxidation of a Guerbet alcohol, product of Sasol), Nature-Wax® C3 container wax (hydrogenated vegetable glycerides with alpha-monoglycerides and sorbitan tristearate, product of Elevance Renewable Sciences), soybean oil, castor oil, 12-hydroxystearic acid, adipic acid, and succinic acid.

Comparative Example 29 utilizes ricinoleic acid but at a low glycol-to-PET ratio (1.0), yielding a viscous product. Comparative Examples 30-33 show that ethylene glycol, even when combined 1:3 with propylene glycol, often gives opaque products that may solidify or give a two-phase product. Comparative Examples 34 and 35 utilize hafnium tetrabutoxide or zirconium tetrabutoxide, respectively, as the catalyst. Under these conditions, these catalysts give a two-phase reaction product, demonstrating the benefit of using titanium tetrabutoxide instead. Comparative Example 36 shows that 40 wt. % of dodecanedioic acid is too much of this hydrophobe to yield a transparent, settling-free product. Comparative Examples 43 and 44 (and Example 22) show that soybean oil can be used as the hydrophobe when the proportion of glycol (in this case, propylene glycol) is sufficiently high. Comparative Examples 47 and 48 show that when the dicarboxylic acid has fewer than 9 carbons, opaque products can result.

As Table 3 shows, ricinoleic acid can be combined with a variety of dicarboxylic acids (from $C_6$ to $C_{18}$) to give polyols having desirable hydroxyl numbers, viscosities, appearance, and settling properties. Transparency can be achieved, although this appears to depend on the proportion of dicarboxylic acid, the molecular weight of the dicarboxylic acid, catalyst selection, and other factors. We surprisingly found, for instance, that when other factors are equal, titanium tetrabutoxide is more forgiving than zinc acetate in providing transparent polyester polyols (compare, for instance, Examples 54 and 55, Examples 58 and 59, or Examples 62 and 63). There was simply no way to predict in advance that titanium tetrabutoxide could give a more transparent polyol than the ever-popular zinc acetate catalyst.

Two-Component Polyurethane Formulations

The polyester polyol (13.8 g, 0.096 eq.), 2-methyl-1,3-propanediol (0.71 g, 0.016 eq.), and ethylene glycol (1.12 g, 0.055 eq.) are combined in a beaker at room temperature. Hexamethylene diisocyanate (8.82 g, 0.105 eq.) and isophorone diisocyanate (4.99 g, 0.045 eq.) are then added. The mixture is diluted to 50 wt. % with 2-butanone and mechanically stirred until a homogeneous mixture results. Dibutyltin dilaurate (0.050 wt. %.) is added. After mixing for about 5 minutes (and a 10° C. exotherm), a bead of the reacting mixture is applied to one side of each of five aluminum panels (4"×6"). The beads of solvent-borne polyurethane are drawn down using a #50 R.D. Specialties bar to a wet film thickness of 4.5 mils. The panels dry in a hood at ambient temperature for at least one hour. They are then heated to 110° C. for 1.5-2 h to complete the cure. The films are tested as described further below.

Aqueous Polyurethane Dispersions

Hydrophobe-modified rPET polyol (0.51 eq., 73.0 g), dimethylolpropionic acid (DMPA, 0.071 eq., 4.75 g), and acetone (50 g) are combined in a round-bottom flask equipped with a heating mantle, condenser, temperature controller and thermocouple, nitrogen purge, and mechanical stirring. 1,6-Hexamethylene diisocyanate (0.54 mol, 45.6 g) and isophorone diisocyanate (0.23 eq., 25.9 g) are added to the polyol mixture and stirring begins. K-KAT® 348 catalyst (0.75 g, bismuth di-2-ethyl hexanoate, King Industries) is added and the resulting exotherm is recorded. The reaction mixture is heated to reflux (56-60° C.) and is held at this temperature for 3 h. An aliquot (3 g) of the reaction mixture is removed via pipette and the % NCO is determined via titration. This NCO value is used to determine ethylene diamine chain extension requirement based on 85% of the remaining NCO. Ethydiisopropylamine (0.074 eq., 4.81 g) is added along with more acetone (50 g) in order to neutralize the DMPA. Heating at reflux continues for another 0.5 h.

Separately, deionized water (281 g, 20° C.) is mixed with BYK® 028 defoamer (2.81 g) at room temperature. The warm prepolymer/acetone mixture (238 g, 55-60° C.) is dispersed into the aqueous defoamer mixture over 2 min. using good agitation at 700 rpm. Ethylenediamine (10% in water, 0.16 eq., 4.48 g) is slowly added to the dispersion at an agitator speed of 500 rpm, followed by continued stirring for 15 min. Aqueous sodium hydroxide (0.057 eq., 1.15 g of 2.0% aq. NaOH) is added, and the mixture stirs for another 15 min.

The resulting polyurethane dispersion is vacuum stripped (25-45° C., 700 to 75 mm Hg). Solids content: 35-40 wt %; pH: 8-10; viscosity: 150-800 cP.

About 5 g of polyurethane dispersion formulation is applied in a bead at the top of five aluminum panels (4"×6"). The bead is drawn down the panel into a wet film using a #50 R.D. Specialties bar to a wet film thickness of 4.5 mils. The PUD panels are placed in a 35° C. oven for 16 h.

In a second series of experiments, a drying catalyst (Borchi® OXY-Coat 1101 iron drying catalyst (0.3-0.4 g, product of Borchers) is included in the preparation of the PUD.

Testing Methods for 2K Polyurethane Coatings and PUD Coatings:

Dry film thickness is determined using a PosiTector 6000 (Defelsko Corporation) dry film thickness gauge. Konig hardness is measured using ISO 1522 using a TQC pendulum hardness tester (Model SP0500). The following ASTM test methods are used: pencil scratch hardness: ASTM D3363; flexibility: ASTM D522; adhesion: ASTM D3359; stain testing: ASTM D1308; viscosity: ASTM D562; polyurethane solids content: ASTM D1582.

Results:

The screening test results in Tables 4 and 5 (not optimized) indicate that the hydrophobe-modified polyols are suitable for making hard, flexible coatings.

The preceding examples are meant only as illustrations; the following claims define the inventive subject matter.

TABLE 1

Hydrophobe-Modified Polyols: Preparation and Properties Inventive Examples

| Ex | Hydrophobe | Cat | Glycol/PET | HP/PET | Wt. % HP | Funct. | Recycle % | OH # | Color | Transparent? | Settles? | Visc., 25° C. |
|---|---|---|---|---|---|---|---|---|---|---|---|---|
| 1 | ricinoleic acid | Zn | 2.7 | 1.2 | 47 | 2.0 | 52 | 393 | gold | yes | no | 639 |
| 2 | ricinoleic acid | Zn | 3.0 | 1.5 | 51 | 2.0 | 48 | 368 | green | yes | no | 576 |
| 3 | ricinoleic acid | Zn | 2.6 | 1.2 | 48 | 2.0 | 52 | 376 | green | yes | no | 705 |
| 4 | ricinoleic acid/PEG | Zn | 2.0 | 0.5 | 20 | 2.0 | 26 | 258 | gold | yes | no | 629 |
| 5 | ricinoleic acid | Ti | 2.0 | 1.5 | 56 | 2.0 | 43 | 282 | amber | yes | no | 1034 |
| 6 | ricinoleic acid | Ti | 2.0 | 1.6 | 58 | 2.0 | 42 | 272 | amber | yes | no | 998 |
| 7 | ricinoleic acid | Ti | 2.7 | 1.2 | 47 | 2.0 | 53 | 387 | gold | yes | slight | 696 |
| 8 | tung oil | Zn | 3.0 | 1.3 | 46 | 2.0 | 54 | 414 | dark green | yes | slight | 555 |
| 9 | tung oil | Zn | 3.0 | 1.5 | 49 | 2.7 | 50 | 397 | amber | some | no | 633 |
| 10 | tung oil | Ti | 3.0 | 1.5 | 50 | 2.2 | 50 | 381 | gold | some | no | 1160 |
| 11* | tung oil | Ti | 3.0 | 1.3 | 46 | 2.0 | 54 | 390 | green-gold | yes | no | 1354 |
| 12 | tung oil | Ti | 3.0 | 1.5 | 50 | 2.0 | 50 | 370 | gold | yes | no | 1000 |
| 13 | tung oil | Ti | 3.0 | 1.5 | 50 | 1.7 | 50 | 383 | gold | yes | no | 538 |
| 14 | azelaic acid | Ti | 3.0 | 0.50 | 18 | 2.0 | 82 | 523 | green | yes | no | 1271 |
| 15 | azelaic acid | Ti | 3.0 | 0.96 | 30 | 2.0 | 70 | 387 | gray-brown | yes | no | 1630 |
| 16 | azelaic acid | Ti | 3.0 | 1.5 | 40 | 2.0 | 60 | 254 | yellow-gray | yes | no | 3470 |
| 17 | dodecanedioic acid | Ti | 3.0 | 0.50 | 22 | 2.0 | 78 | 496 | green | yes | no | 1154 |
| 18 | dodecanedioic acid | Ti | 3.0 | 0.78 | 30 | 2.0 | 70 | 414 | green | some | slight | 1503 |
| 19 | Toximul ® 8244 | Zn | 3.0 | 0.50 | 59 | 2.1 | 41 | 352 | green | yes | no | 814 |
| 20* | Toximul ® 8244 | Ti | 3.0 | 0.50 | 59 | 2.1 | 41 | 372 | amber | yes | no | 728 |
| 21 | isostearyl alcohol/glycerin | Ti | 3.3 | 0.25 | 13 | 2.0 | 82 | 754 | green | yes | no | 610 |
| 22 | soybean oil/PG | Ti | 3.0 | 0.50 | 51 | 2.2 | 49 | 378 | green-yellow | yes | no | 182 |
| 23 | sunflower oil | Ti | 3.0 | 0.50 | 51 | 2.2 | 49 | 387 | light green | yes | no | 187 |
| 24 | BiOH ® X-0002 polyol | Ti | 3.0 | 0.45 | 62 | 2.0 | 38 | 343 | gold | yes | no | 14817 |
| 25 | ESBO/propionic acid | Ti | 3.0 | 0.50 | 49 | 2.1 | 47 | 394 | gold | yes | no | 3191 |
| 26 | ESBO | Ti | 3.0 | 0.50 | 51 | 2.2 | 49 | 386 | yellow-green | yes | no | 1886 |
| 27 | Cardolite ® LITE 2020/trimellitic anhydride with PG/PEG** | Ti | — | — | 31 | 2.0 | 50 | 361 | dark brown | yes | no | 4259 |
| 28 | recycled cooking oil (carbon treated) | Ti | 3.0 | 0.5 | 51 | 2.2 | 100 | 391 | dark brown | yes | no | — |

Hydrophobe reacted with digested PET except as indicated with * for hydrophobe charged at start of PET digestion.

**Glycolysis performed using rPET, PG, and PEG 200. Cardolite ® LITE 2020 (hydroxyethylated cardanol) is pre-reacted with trimellitic anhydride at 140° C. prior to its combination with the glycolysis mixture, then esterified 5 h at 200° C.

TABLE 2

Hydrophobe-Modified Polyols: Preparation and Properties: Comparative Examples

| Ex | Hydrophobe (HP) | Cat | Glycol/ PET | HP/ PET | Wt. % HP | Funct. | Recycle % | OH % | Color | Transparent? | Settles? | Visc., 25° C. |
|---|---|---|---|---|---|---|---|---|---|---|---|---|
| C29 | ricinoleic acid (RA) | Ti | 1.0 | 1.5 | 62 | 2.0 | 37 | 103 | light brown | no | no | high |
| C30 | RA/EG | Zn | 3.0 | 1.8 | 58 | 2.0 | 42 | 349 | gray | no | solid | — |
| C31 | RA/EG | Zn | 3.0 | 1.0 | 44 | 2.0 | 56 | — | gray | no | solid | — |
| C32 | RA/2:2 EG/PG | Zn | 4.0 | 1.0 | 38 | 2.0 | 61 | — | gray-gold | no | bilayer | — |
| C33 | RA/1:3 EG/PG | Zn | 4.0 | 2.0 | 57 | 2.9 | 43 | 394 | gray-gold | no | bilayer | — |
| C34 | tung oil | Hf | 3.0 | 1.5 | 50 | 2.0 | 50 | 123 | green-gold | no | bilayer | — |
| C35 | tung oil | Zr | 3.0 | 1.5 | 50 | 2.0 | 50 | 138 | green-gold | no | bilayer | — |
| C36 | dodecanedioic acid | Ti | 3.0 | 1.2 | 40 | 2.0 | 60 | — | gray | no | yes | 3844 |
| C37 | metath. linseed oil | Zn | 3.0 | 0.45 | 49 | 2.1 | 51 | 409 | brown | no | heavy | 204 |
| C38 | metath. linseed oil | Ti | 3.0 | 0.45 | 49 | 2.1 | 51 | 403 | amber | no | no | 242 |
| C39 | Isocarb ® 24 | Zn | 3.0 | 0.25 | 18 | 1.9 | 81 | 610 | gray-gold | no | bilayer | — |
| C40 | Isocarb ® 24 | Ti | 3.0 | 0.25 | 18 | 1.9 | 82 | 635 | green-gold | no | bilayer | — |
| C41 | NatureWax ®/glycerin | Zn | 2.0 | 0.25 | 37 | 2.7 | 62 | — | gray-gold | no | bilayer | — |
| C42 | NatureWax ®/glycerin | Ti | 2.0 | 0.25 | 37 | 2.7 | 62 | — | gray-gold | no | bilayer | — |
| C43 | soybean oil/PG | Ti | 2.0 | 0.40 | 50 | 2.2 | 50 | — | yellow-green | no | yes | 320 |
| C44 | soybean oil/glycerin | Ti | 2.0 | 0.25 | 37 | 2.7 | 32 | — | green-gold | no | bilayer | — |
| C45 | castor oil | Ti | 2.0 | 0.50 | 57 | 2.1 | 43 | 353 | green | no | no | 1293 |
| C46 | 12-hydroxystearic acid | Ti | 3.0 | 0.50 | 26 | 2.0 | 74 | 575 | green | no | solid | — |
| C47 | adipic acid | Zn | 3.0 | 0.50 | 15 | 2.0 | 85 | 566 | gray-green | no | slight | 1167 |
| C48 | succinic acid | Zn | 3.0 | 0.50 | 12 | 2.0 | 87 | 572 | gray-green | no | slight | 1250 |

TABLE 3

Hydrophobe-Modified Polyols from Ricinoleic Acid and Dicarboxylic Acids Inventive Examples

| Ex | Diacid | Cat | Glycol/ PET | RA/ PET | Wt. % RA | DA/ PET | DA/ RA | Recycle % | OH # | Color | Transparent? | Settles? | Visc., 25° C. |
|---|---|---|---|---|---|---|---|---|---|---|---|---|---|
| 49 | adipic | Zn | 3.0 | 1.30 | 49 | 0.1 | 0.08 | 51 | 371 | gold | no | slight | 616 |
| 50 | adipic | Zn | 3.0 | 1.05 | 45 | 0.2 | 0.19 | 55 | 445 | gold | no | slight | 725 |
| 51 | adipic | Zn | 3.0 | 0.56 | 35 | 0.4 | 0.71 | 65 | 445 | gold | no | slight | 924 |
| 52 | adipic | Ti | 3.0 | 1.05 | 45 | 0.2 | 0.19 | 55 | 396 | gold | some | no | 732 |
| 53 | suberic | Zn | 3.0 | 1.29 | 49 | 0.1 | 0.08 | 51 | 395 | amber | some | no | 601 |
| 54 | suberic | Zn | 3.0 | 0.52 | 35 | 0.4 | 0.76 | 65 | 445 | amber | no | no | 911 |
| 55 | suberic | Ti | 3.0 | 0.52 | 35 | 0.4 | 0.76 | 65 | 436 | gold | yes | no | 882 |
| 56 | azelaic | Zn | 3.0 | 1.39 | 51 | 0.1 | 0.07 | 49 | 324 | gold | yes | slight | 646 |
| 57 | azelaic | Zn | 3.0 | 1.22 | 49 | 0.2 | 0.16 | 51 | 381 | amber | some | no | 637 |
| 58 | azelaic | Zn | 3.0 | 1.06 | 47 | 0.3 | 0.28 | 53 | 397 | amber | no | no | 1132 |
| 59 | azelaic | Ti | 3.0 | 1.06 | 47 | 0.3 | 0.28 | 53 | 353 | gold | yes | no | 820 |
| 60 | sebacic | Zn | 3.0 | 1.38 | 51 | 0.1 | 0.07 | 49 | 374 | gold | yes | no | 668 |
| 61 | sebacic | Zn | 3.0 | 1.22 | 49 | 0.2 | 0.16 | 51 | 375 | gold | some | no | 717 |
| 62 | sebacic | Zn | 3.0 | 1.05 | 47 | 0.3 | 0.29 | 53 | 368 | gold | no | no | 943 |
| 63 | sebacic | Ti | 3.0 | 1.05 | 47 | 0.3 | 0.29 | 53 | 378 | gold | yes | no | 820 |
| 64 | octadecanedioic | Zn | 3.0 | 1.34 | 51 | 0.1 | 0.07 | 49 | 369 | gold | some | no | 682 |
| 65 | octadecanedioic | Zn | 3.0 | 1.14 | 49 | 0.2 | 0.18 | 51 | 364 | gold | no | no | 895 |
| 66 | octadecanedioic | Zn | 3.0 | 0.94 | 47 | 0.3 | 0.32 | 53 | 382 | gold | no | no | — |
| 67 | octadecanedioic | Ti | 3.0 | 0.94 | 47 | 0.3 | 0.32 | 53 | 374 | gold | no | no | 2830 |

Functionality = 2.0 for all runs.

TABLE 4

Two-Component (2K) Polyurethane Coatings* from Hydrophobe-Modified Polyols

| Ex | Hydrophobe for polyol modification | OH # | Pencil hardness | Stain Testing (and 1-hour recovery results) | | | | DFT (ave) | Konig hardness Oscill. (ave) | 1/8" mandrel bend | X-Hatch Adhesion |
|---|---|---|---|---|---|---|---|---|---|---|---|
| | | | | MUS | SUN | WIN | H$_2$O | | | | |
| 68 | ricinoleic acid | 387 | H | 3/3 | 3/3 | 5/5 | 3/3 | 1.40 | 27 | P | 5B |
| 69 | tung oil | 383 | H | 4/5 | 5/5 | 5/5 | 5/5 | 1.41 | 82 | F | 5B |
| 70 | ricinoleic acid + octadecanedioic acid | 374 | H | 5/5 | 5/5 | 5/5 | 4/4 | 1.05 | 81 | P | 5B |

TABLE 4-continued

Two-Component (2K) Polyurethane Coatings* from Hydrophobe-Modified Polyols

| Ex | Hydrophobe for polyol modification | OH # | Pencil hardness | Stain Testing (and 1-hour recovery results) | | | | Konig hardness | | ⅛" mandrel bend | X-Hatch Adhesion |
|---|---|---|---|---|---|---|---|---|---|---|---|
| | | | | MUS | SUN | WIN | H₂O | DFT (ave) | Oscill. (ave) | | |
| 71 | Toximul ® 8244 | 372 | H | 1/1 | 1/1 | 2/2 | 1/1 | 0.73 | 9 | P | 5B |
| 72 | recycled cooking oil | 347 | H | 4/4 | 5/5 | 5/5 | 4/5 | 0.74 | 49 | P | 5B |

*Screening formulation only; coating performance not optimized.
MUS = mustard,
SUN = sunscreen,
WIN = Windex ® cleaner.
DFT = dry film thickness (mils).

TABLE 5

Polyurethane Dispersion-based Coatings* from Hydrophobe-Modified Polyols

| Ex | Hydrophobe for polyol modification | OH # | % solids | Visc cP | pH | Pencil hardness | Stain Testing (and 1-hour recovery results) | | | | Konig hardness | | ⅛" mandrel bend | X-Hatch Adhesion |
|---|---|---|---|---|---|---|---|---|---|---|---|---|---|---|
| | | | | | | | MUS | SUN | WIN | H₂O | DFT (ave) | Oscill. (ave) | | |
| 73 | ricinoleic acid | 387 | 35.9 | 238 | 8.3 | H | 5/5 | 5/5 | 5/4 | 5/5 | 1.08 | 88 | P | 5B |
| 74 | +drying catalyst | | | | | H | 4/5 | 5/5 | 5/5 | 5/5 | 1.11 | 85 | P | 5B |
| 75 | tung oil | 383 | 41.9 | 209 | 8.7 | H | 5/5 | 5/5 | 5/4 | 5/5 | 1.12 | 85 | F | 5B |
| 76 | +drying catalyst | | | | | H | 4/5 | 5/5 | 5/5 | 4/4 | 1.27 | 81 | F | 3B |
| 77 | ricinoleic acid + octadecanedioic acid | 374 | 37.3 | 120 | 9.3 | H | 4/4 | 4/4 | 4/3 | 3/3 | 1.00 | 85 | P | 5B |
| 78 | +drying catalyst | | | | | H | 4/5 | 5/5 | 5/5 | 4/4 | 1.11 | 67 | P | 5B |
| 79 | Toximul ® 8244 | 372 | 32.9 | 184 | 9.9 | H | 4/4 | 4/4 | 4/1 | 2/2 | 0.84 | 46 | P | 0B |
| 80 | +drying catalyst | | | | | H | 3/5 | 5/5 | 1/1 | 3/3 | 0.94 | 32 | P | 4B |
| 81 | recycled cooking oil | 347 | 38.1 | 243 | 8.2 | H | 4/4 | 2/2 | 2/1 | 1/1 | 0.94 | 18 | F | 0B |
| 82 | +drying catalyst | | | | | H | 4/4 | 3/3 | 1/1 | 1/1 | 1.04 | 27 | F | 0B |

*Screening formulation only; coating performance not optimized.
"Drying catalyst" is Borchi ® OXY-Coat 1101 iron drying catalyst (product of Borchers).
MUS = mustard,
SUN = sunscreen,
WIN = Windex ® cleaner.
DFT = dry film thickness (mils).

We claim:

1. A polyester polyol comprising a reaction product of:
   (a) a thermoplastic polyester;
   (b) a glycol; and
   (c) a hydrophobe, wherein the hydrophobe is a mixture of ricinoleic acid and a saturated or unsaturated $C_9$-$C_{18}$ dicarboxylic acid, and the hydrophobe comprises at least 80 wt. % of ricinoleic acid;
   wherein the molar ratio of glycol to thermoplastic polyester reactants is at least 2.0, the amount of hydrophobe reacted into the polyol is within the range of 3 to 70 wt. %, and the polyol has an average hydroxyl functionality within the range of 1.8 to 2.7 and a hydroxyl number within the range of 25 to 800 mg KOH/g.

2. The polyol of claim 1 wherein the thermoplastic polyester is selected from the group consisting of polyethylene terephthalate; polybutylene terephthalate; polytrimethylene terephthalate; glycol-modified polyethylene terephthalate; copolymers of terephthalic acid and 1,4-cyclohexanedimethanol; isophthalic acid-modified copolymers of terephthalic acid and 1,4-cyclohexanedimethanol; polyhydroxy alkanoates; copolymers of diols with 2,5-furandicarboxylic acid or dialkyl 2,5-furandicarboxylates; copolymers of 2,2,4,4-tetramethyl-1,3-cyclobutanediol with isophthalic acid, terephthalic acid or orthophthalic derivatives; dihydroferulic acid polymers, and mixtures thereof.

3. The polyol of claim 1 wherein the thermoplastic polyester is selected from the group consisting of virgin PET, recycled PET, and mixtures thereof.

4. The polyol of claim 1 wherein the glycol is selected from the group consisting of ethylene glycol, propylene glycol, 1,3-propanediol, 1,2-butylene glycol, 1,3-butylene glycol, 1,4-butanediol, 2-methyl-1,3-propanediol, pentaerythritol, sorbitol, neopentyl glycol, glycerol, trimethylolpropane, 3-methyl-1,5-pentanediol, 1,4-cyclohexane-dimethanol, 1,3-cyclohexanedimethanol, bisphenol A ethoxylates, diethylene glycol, tetraethylene glycol, dipropylene glycol, triethylene glycol, tripropylene glycol, polyethylene glycols having a number average molecular weight up to about 400 g/mol, block or random copolymers of ethylene oxide and propylene oxide, and mixtures thereof.

5. The polyol of claim 1 wherein the glycol comprises a recycled glycol.

6. The polyol of claim 1 having a hydroxyl number within the range of 35 to 500 mg KOH/g.

7. The polyol of claim 1 wherein the hydrophobe is reacted into the polyol in an amount within the range of 5 to 60 wt. %.

8. The polyol of claim 1 wherein the molar ratio of glycol to thermoplastic polyester reactants is within the range of 2.5 to 4.5.

9. The polyol of claim 1 having a viscosity at 25° C. less than 10,000 cP.

10. A transparent polyol of claim 1.

11. The polyol of claim 1 having a recycle content as defined herein greater than 25 wt. %.

12. The polyol of claim 1 having an acid number of less than 10 mg KOH/g.

13. A polyester polyol comprising a reaction product of:
(a) polyethylene terephthalate;
(b) propylene glycol; and
(c) a hydrophobe, wherein the hydrophobe comprises a mixture of ricinoleic acid with a saturated or unsaturated $C_9$-$C_{18}$ dicarboxylic acid;
wherein the molar ratio of propylene glycol to polyethylene terephthalate reactants is within the range of 2.5 to 4.5, the amount of hydrophobe reacted into the polyol is within the range of 4 to 60 wt. %, and the polyol has an average hydroxyl functionality within the range of 1.8 to 2.7 and a hydroxyl number within the range of 40 to 500 mg KOH/g.

14. A process for making a polyester polyol, comprising:
(a) heating a thermoplastic polyester with a glycol to give a digested intermediate; and
(b) reacting the intermediate with a hydrophobe, wherein the hydrophobe comprises a mixture of ricinoleic acid with a saturated or unsaturated $C_9$-$C_{18}$ dicarboxylic acid and the hydrophobe comprises at least 80 wt. % of ricinoleic acid to give the polyol;
wherein the molar ratio of glycol to thermoplastic polyester reactants is at least 2.0, the amount of hydrophobe reacted into the polyol is within the range of 3 to 70 wt. %, and the polyol has an average hydroxyl functionality within the range of 1.8 to 2.7 and a hydroxyl number within the range of 25 to 800 mg KOH/g.

15. The process of claim 14 wherein the thermoplastic polyester and glycol are heated in the presence of a titanium catalyst.

16. The process of claim 14 wherein the thermoplastic polyester and glycol are heated at a temperature within the range of 80° C. to 260° C.

17. A process for making a polyester polyol, comprising:
reacting a thermoplastic polyester, a glycol, and a hydrophobe, wherein the hydrophobe comprises a mixture of ricinoleic acid with a saturated or unsaturated $C_9$-$C_{18}$ dicarboxylic acid and the hydrophobe comprises at least 80 wt. % of ricinoleic acid to produce the polyol;
wherein the molar ratio of glycol to thermoplastic polyester reactants is at least 2.0, the amount of hydrophobe reacted into the polyol is within the range of 3 to 70 wt. %, and the polyol has an average hydroxyl functionality within the range of 1.8 to 2.7 and a hydroxyl number within the range of 25 to 800 mg KOH/g.

18. The process of claim 17 wherein the thermoplastic polyester, glycol, and hydrophobe are heated in the presence of a titanium catalyst.

19. The process of claim 17 wherein the thermoplastic polyester, glycol, and hydrophobe are heated at a temperature within the range of 80° C. to 260° C.

* * * * *